United States Patent [19]
Narad et al.

[11] Patent Number: 5,367,695
[45] Date of Patent: Nov. 22, 1994

[54] BUS-TO-BUS INTERFACE FOR PREVENTING DATA INCOHERENCE IN A MULTIPLE PROCESSOR COMPUTER SYSTEM

[75] Inventors: Charles E. Narad, Santa Clara; Sun-Den Chen, San Jose, both of Calif.

[73] Assignee: Sun Microsystems, Inc., Mountain View, Calif.

[21] Appl. No.: 766,784

[22] Filed: Sep. 27, 1991

[51] Int. Cl.⁵ .............................................. G06F 13/00
[52] U.S. Cl. ...................... 395/800; 395/725; 395/775; 395/650; 370/85.9; 364/230; 364/240.2; 364/264.6; 364/281.3; 364/DIG. 1
[58] Field of Search ............... 395/800, 725, 425, 325, 395/650, 775; 370/85.1, 85.9, 85.13, 91; 379/201, 215, 274, 277

[56] References Cited
U.S. PATENT DOCUMENTS

| | | | |
|---|---|---|---|
| 4,191,997 | 3/1980 | Luiz ..................................... | 395/725 |
| 4,574,350 | 3/1986 | Starr ..................................... | 395/725 |
| 4,912,633 | 3/1990 | Schweizer et al. ................ | 395/800 |
| 5,115,499 | 5/1992 | Stiffles et al. ...................... | 395/425 |
| 5,148,545 | 9/1992 | Herbst et al. ...................... | 395/725 |

*Primary Examiner*—Alyssa H. Bowler
*Assistant Examiner*—Alpesh M. Shah

*Attorney, Agent, or Firm*—Blakely Sokoloff Taylor & Zafman

[57] ABSTRACT

A bus-to-bus interface preserves data coherence between masters and slaves operating within a multiple processor computer system. Two buses are connected via the interface. The first bus connects a number of self-identifying masters. The second bus connects a number of master devices and a number of slave devices. The second bus has no mechanism with which devices connected to the second bus may identify themselves. The interface contains a pair of registers for each slave device connected through the second bus. One register stores a busy bit if the corresponding slave is engaged on behalf of a master. The second register stores an identifying code for the master delegating a task to the corresponding slave. When a slave has accepted a task on behalf of a master and commanded the master to relinquish the bus, the busy register will be set and the master identification register will store the identifying code for the delegating master. Thereafter no master will be permitted to access the engaged slave unless the master identification code is that of the delegating master. Moreover, a delegating master will be denied access to the slave by that slave until the slave has completed the task accepted on behalf of the master. By preventing unintended masters from accessing slaves prior to the delegating master, inadvertent data transferred to the wrong master is avoided. Data coherence between master and slave is thereby ensured.

35 Claims, 5 Drawing Sheets

BUS-TO-BUS INTERFACE

MASTER-SLAVE DIRECTORY

BUS-TO-BUS INTERFACE FOR PREVENTING DATA INCOHERENCE IN A MULTIPLE PROCESSOR COMPUTER SYSTEM

RELATED APPLICATIONS

The present invention is related to the following copending applications: Ser. No. 07/767,122 now U.S. Pat. No. 5,287,503, entitled "Methods and Apparatus For A Register Providing Atomic Access to Set and Clear Individual Bits of Shared Registers Without Software Interlock"; application Ser. No. 07/766,834, entitled "Methods and Apparatus for Locking Arbitration on a Remote Bus"; application Ser. No. 07/767,023, entitled "Methods and Apparatus For Dynamically Steering Undirected Interrupts"; and application Ser. No. 07/766,835, entitled "A Bus Arbitration Architecture Incorporating Deadlock Detection and Masking".

BACKGROUND OF THE INVENTION

1. Field of the Invention:

The present invention relates to multiple-processor computer system architecture. More particularly, the present invention describes the hardware implementation of a bus-to-bus interface over which multiple master devices may communicate with multiple shared slave devices while maintaining data consistency between accessing masters.

2. Art Background:

Multipurpose computer systems generally contain a communications pathway over which the computer may communicate to a variety of internal and external devices. This communications pathway is typically termed a bus, which permits a device within the computer to either talk with or listen to another device also connected to the bus. The communications from one device to another commonly consist of master and slave operations, such as read or write depending whether the device is controlling, or being controlled by another device. In bus communications, a controlling device, generally termed a master, issues a command. Thereafter, a controlled device, commonly termed a slave, will accept the command and issue a completion signal when finished. Some buses permit other forms of acknowledgement, such as the indication of the occurrence of an error. In multiple master computer systems, buses also permit a slave device to signal that the controlling master device should "rerun" or relinquish the bus and retry to access the slave at some later time. A rerun cycle is issued when a slave is presently occupied, and cannot accept a command issued from a master. Where a slave cannot accept a task from a master, the slave will indicate that the master should disconnect from the bus and retry the access at some later time, thereby freeing the bus so that another master may access another slave. A prior art multiple processor is shown in FIG. 1a. Rerun cycles are issued when a slave is engaged in an internal deadlock condition, or when a slave is engaged in a lengthy task or internal access of long duration.

Whenever a rerun cycle is issued, the disconnection of the master from the bus may occur in one of two fashions. If a slave issues a rerun cycle when the slave has accepted an operation from a master, and the slave is engaged in an internal operation or a task of long duration, such a disconnect of the master is termed stateful. That is, after the slave signals the master to disconnect from the bus the slave retains data and conditions on behalf of the disconnected master. In contrast, a stateless disconnect occurs when a slave, for whatever reason, cannot accept an access attempt from a master, before the access triggers any internal operation, at which time the slave issues the rerun command and signals the master to disconnect from the bus. For example, the slave may already be engaged on behalf of another master, or another internal condition may require the slave to retain access to the bus before the slave can accept another task from a master. If a slave cannot accept an access by a master and issues a rerun command, and the slave does not maintain any state or storage of any information that the access ever occurred, then the disconnect is stateless. Stateless disconnects are typically encountered whenever a master attempts to access a slave, but all registers or I/O ports within the slave are presently engaged. In the case of a stateless disconnect, no information or conditions are stored in the slave regarding the access attempt by the master, and the slave remains open to other masters attempting to access a slave. In both circumstances, it is desirable that the master device attempting to access the slave disconnect from the bus so that the bus may be used for other gainful activity pending completion of the slave's task.

In a multiple processor environment, there exists a significant risk that a master, other than the master delegating the task to a particular slave, will access the slave upon completion of the slave's task. In the absence of cautionary measures, it is possible that data or conditions intended for a particular master could be transferred to the first master accessing the slave upon completion of the slave's cycle. To guard against inadvertent transfer of data or conditions from a slave to an erroneous master, prior art single bus multiple processor architectures provide that the slave device can discriminate between access attempts by the various masters operating on the bus. Thus, a slave can identify from which master it is disconnected, and will permit only that master to reconnect to it when the delegated task is completed. As a result, until the slave device completes its tasks and transfers the desired information or conditions to the master assigning the task, all other master access attempts will be rejected, and the master attempting the access will be instructed to rerun. Typically the discrimination information which permits a slave to distinguish between masters is contained and maintained within the slave device itself. FIGS. 1b and 1c illustrate prior art master and slave devices containing self identification and discrimination facilities.

More recently, multiple bus architectures operating within multiple processor system environments have become common. In multiple bus multiple processor systems, not all slave devices operating on one bus of the system may have the ability to discriminate between master devices which operate on that, or another bus. If the slave device itself possesses no facility for ensuring consistency between data stored in the slave and the master for which the data is intended, the transfer of data on that bus may be compromised. The consistency between data and intended master is generally termed coherence. In such systems, the likelihood of data incoherence, that is the inadvertent data transfer from slave to master, is increased dramatically whenever a slave device issues a rerun command and the master disconnects from the bus. Because a master operating on a different bus may not be identifiable by the slaves accessed by the master, it is possible that a master will be permitted to access a slave which has just completed a task delegated by a different master before the delegating master reconnects. The result is that data earmarked for the delegating master is now lost to it, leading to an erroneous result or system failure.

SUMMARY OF THE INVENTION

The present invention provides for a hardware implementation of a bus-to-bus interface to preserve data coherence between masters and slaves operating within a multiple bus multiple processor computer system environment. The bus-to-bus interface may be implemented in silicon using any of a variety of silicon processing technologies including, but not limited to, NMOS and CMOS.

In the preferred embodiment, two buses are connected via the bus-to-bus interface. The first bus is denominated Bus M on which operate a number of master devices. The second bus, denominated Bus S, may connect a number of either slave and or master devices. The bus-to-bus interface includes a hardware rerun mechanism whereby a slave, when accessed, may signal a master attempting to access such slave to disconnect and retry the access later. The bus-to-bus interface further includes a master-slave directory which maintains a pair of registers for each slave operating on Bus S. One register is labeled BUSY, and stores a BUSY bit. The BUSY bit is set when a slave has issued a RERUN command to a master attempting an access. The BUSY bit remains set until the delegating master has reaccessed the slave and received the intended data. The bus-to-bus interface will reject all access attempts by other masters to the slave whose BUSY bit is set by issuing RERUN commands to the other masters. The second register is labeled MASTER ID, and stores a multiple bit master identification code identifying the delegating master causing the BUSY bit to be set. The master identification code is sent out by the master device initiating the access or the arbitration device which knows the master identification code of the accessing master. The bus-to-bus interface recognizes the busy slave as the slave to which access is desired by the address range assigned to that slave and put out by the master attempting the access.

When a master operating on Bus M accesses a slave operating on Bus S and delegates to the slave a task which the slave accepts, and thereafter instructs the master to relinquish the bus and retry access later, the master-slave directory will mark such accessed slave as busy by setting the corresponding BUSY bit. Simultaneously, the bus-to-bus interface stores the delegating master's identification code in the MASTER ID register corresponding to the accessed slave. Thereafter, only the delegating master which accessed the slave and caused the BUSY bit to be set is permitted to reconnect to that slave. Whenever a different master operating on Bus M or Bus S attempts to access the slave engaged on behalf of the delegating master, the master-slave directory will determine that engaged slave's BUSY bit is set. The bus-to-bus interface then signals to the master that the slave is busy, and commands the master to RERUN. If, at a later time, the delegating master retries an access, the master-slave directory within the bus-to-bus interface will determine that the master identification code stored in the MASTER ID register matches that of the master attempting the access. Access by the delegating master to the intended slave is conditional upon the slave having completed the delegated task. If the slave is not yet ready to signal completion of the task the slave will issue a RERUN command. However, a second master is free to access any other slave device operating on Bus S, so long as the BUSY bit corresponding to the other slave and controlled by the master-slave directory remains clear. Thus, the bus-to-bus interface itself engages in discrimination of master-to-slave interconnects on behalf of all slaves and masters operating on the buses connected by such interface, without requiring that the slave devices individually have the capability to identify which master is attempting the access.

BRIEF DESCRIPTION OF THE DRAWINGS

The objects, features and advantages of the present invention will be apparent from the following detailed description in which.

DETAILED DESCRIPTION OF THE INVENTION

Figure 1A:
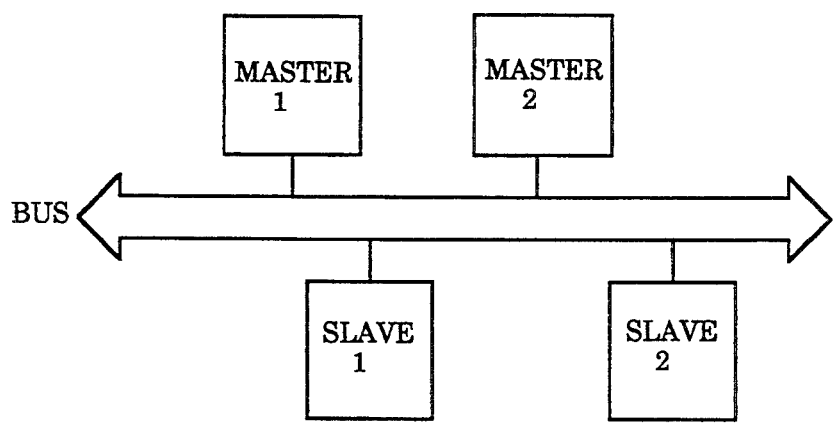
FIG. 1a illustrates a prior art multiple processor data communications bus.
Figure 1B:
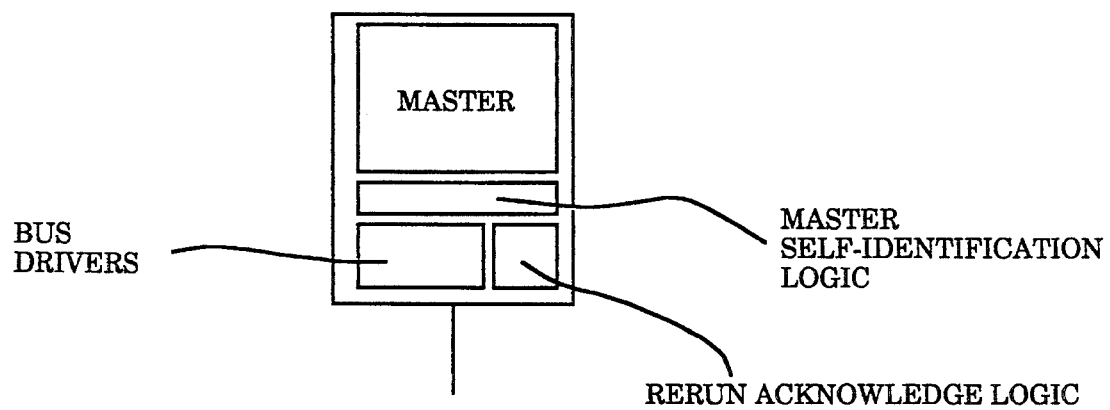
FIGS. 1b and 1c illustrate prior art master and slave devices containing internal master identification and discrimination facilities.
Figure 1C:
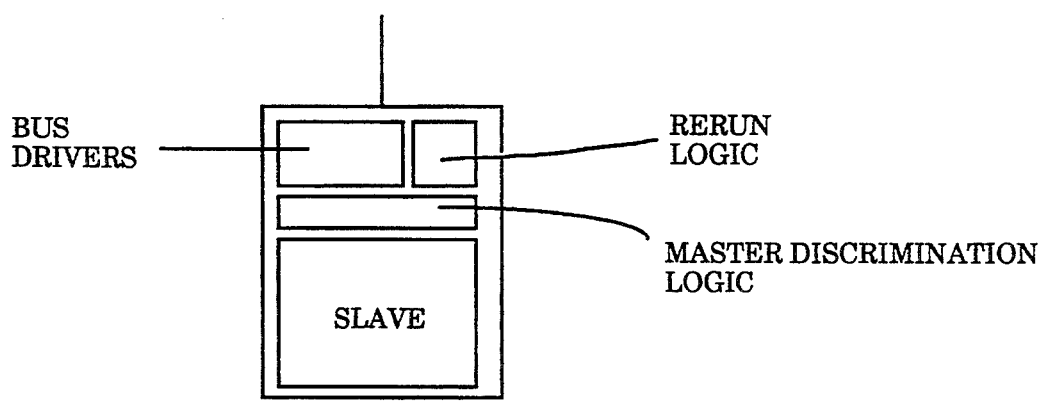

A bus-to-bus interface preserving data coherence between masters and slaves operating in a multiple processor computer system is disclosed. In the following description, for purposes of explanation, specific numbers, times, signals etc., are set forth in order to provide a thorough understanding of the present invention. However, it will be apparent to one skilled in the art that the present invention may be practised without these specific details. In other instances, well known circuits and devices are shown in block diagram form in order not to obscure the present invention unnecessarily.

In this description, a master refers to any device which drives another device or which permits another device to be governed, monitored, or controlled by the master. Conversely, a slave refers to any device which is operated or controlled by another device, usually a master. Further, in the description which follows, "bus" refers to the generally accepted meaning of a common group of circuit paths over which input and output signals are routed. In particular, throughout the description of the present invention, "bus" is used to signify either of two standardized communication pathways known as MBus and SBus. Representative computer systems employing Mbus and SBus communication path protocols are manufactured by Sun Microsystems, Inc., Mountain View, Calif. However, throughout this description, both MBus and SBus datapaths will be referred to by the more general labels "Bus M" and "Bus S" respectively, in order not to obscure the general descriptions given. Particular detailed information and data related to the MBus and SBus data communications implementations may be found in the *MBus Specification*, Revision 2.0, and the *Sbus Specification*, Revision B.0, both written and published by Sun Microsystems, Inc., Mountain View., Calif.

Bus M interconnects a number of master devices. Bus S interconnects a number of master or slave devices. Both Bus M and Bus S permit a slave to transmit a RERUN signal that the controlling master should "rerun", that is, relinquish the bus and retry to access the slave at some later time. RERUN cycles are well known in the art, and are typically issued when a slave is presently occupied on behalf of another master, and therefore cannot accept a command from a new master.

A predominant characteristic of the present invention is that neither the slave devices nor the Bus S which interconnects the slaves contain facilities to identify to a slave which master is attempting an access. Nonetheless, the bus-to-bus interface of the present invention permits slaves to identify accessing masters by storing master identification codes in hardware registers in the bus-to-bus interface. Another significant aspect of the present invention is that a hardware register is employed to indicate whether the slave device is statefully occupied on behalf of a master. No master except the delegating master is permitted to access the slave while the engaged slave is occupied.

If a bus-to-bus transaction between a master and a slave carries with it information about which master is attempting the access, the slave can reject access attempts by masters other than the master which delegated the task to the slave. If the bus is interfaced to another bus which has no facility for master identification, it is still possible to provide a protection mechanism in the interface logic to guard against inadvertent access of the slave by an erroneous master. Three constraints must be accommodated in the bus-to-bus interface which is the subject of the present application:

i. There exists only one form of RERUN, which commands a master to relinquish the bus and retry later. Both Bus S and Bus M protocols are provided with facility for issuing RERUN commands.
 ii. Slave devices on Bus S are addressed and selected by a known physical address range assigned to each slave.
 iii. Master devices are required to retry access attempts that were disconnected by the slave device issuing a RERUN ACKNOWLEDGE. A master is not permitted to abandon an access attempt until the slave indicates valid completion of the access.

Disconnecting a master device from the bus pursuant to a RERUN command may be done in one of two fashions. The disconnect may be "stateless", or the disconnect may be "stateful". In a stateless disconnect, a master disconnecting from the bus leaves no information or condition pending in the slave accessed. Once a master has statelessly disconnected from the slave and from the bus, a slave is free to be accessed by another master without condition. The second form of disconnect, termed stateful, describes a condition where the slave device remains engaged in a task on behalf of the master device when the slave signals the master to disconnect and return later. In the stateful disconnect, the master disconnects as in the first case, but the slave device retains conditions and data which are earmarked for the now disconnected master. A significant feature of the present invention is that once the master has statefully disconnected from the bus, the bus-to-bus interface thereafter will not permit a master, except the delegating master, to reconnect to that slave until the delegated task is complete. Pending completion of the delegated task, a statefully occupied slave will issue the RERUN command signalling that any master attempting to access such statefully occupied slave that the master should relinquish control of the bus and retry the access cycle some time later. Once the task has been completed, the delegating master, upon retrying the access to the slave, is permitted to connect to the slave and retrieve the data or condition desired.

Figure 2:
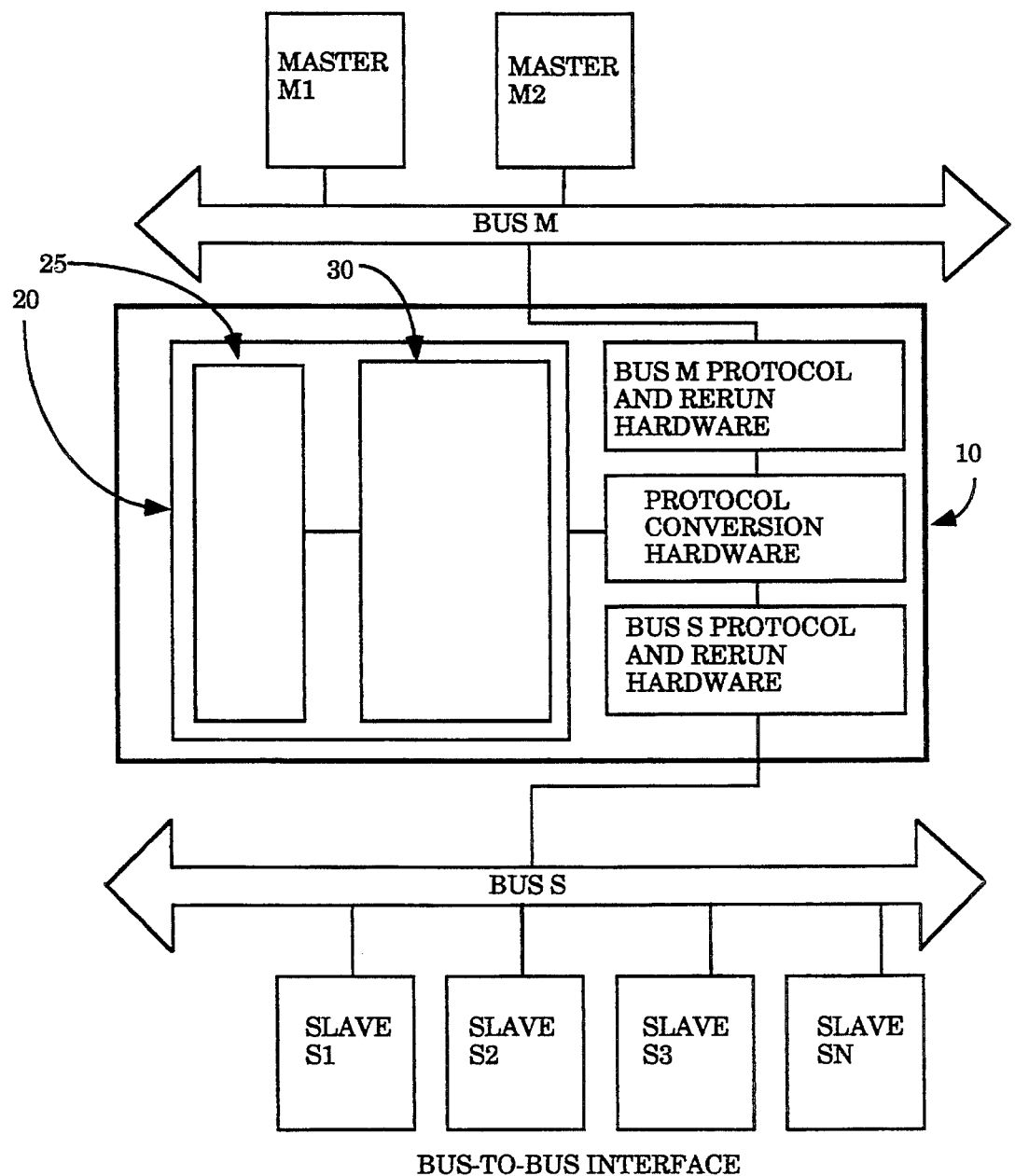
FIG. 2 illustrates the preferred embodiment of the present invention employing two buses connected by a bus-to-bus interface, wherein one bus has no facility to identify which master has previously accessed a slave operating on such bus.

Referring now to FIG. 2, a block diagram of the bus-to-bus interface within the computer system employing the present invention is shown. In FIG. 2, a bus-to-bus interface 10 connects a Bus M to a Bus S. Bus M is a multipurpose communications pathway to which may be connected a number of master devices. Masters connected to Bus M are self-identifying. A self-identifying master has the capability to identify itself to a slave device that the master delegated the task in which the slave is engaged. Bus S is also a general purpose communications pathway within the same computer system, to which may be connected a number of both master and slave devices. However, unlike devices connected to Bus M, devices connected to Bus S have no facility for self-identification. Both Bus S and Bus M interact with hardware RERUN mechanisms contained within bus-to-bus interface 10, wherein a slave, while disconnected, may command a master device attempting to access the slave to disconnect and retry the access later. The hardware RERUN mechanism is well known in the prior art, and is implemented in both the Bus M Protocol and Bus S Protocol hardware shown within bus-to-bus interface 10.

Contained within bus-to-bus interface 10 is a master-slave directory 20 which stores slave status data and master identification data. Master-slave directory 20 receives slave status and master identification data from master-slave and slaves connected to either Bus M or Bus S, as such masters and slaves communicate via bus-to-bus interface 10. Functionally, the master-slave directory contained within bus-to-bus interface 10 relates the status of each of the slave coupled to Bus S to each of the masters coupled to either Bus M or Bus S. The stored information would, for example, include whether a particular slave were currently available for access. Alternatively, the directory could determine that a master were statefully disconnected, the slave having previously issued a RERUN command to the accessing master. If a slave is statefully engaged on behalf of a master, the directory would indicate from which master the slave disconnected.

Contained within master slave directory 20 is a BUSY register block 25. BUSY register block 25 consists of a number of registers constituting "busy flags", each register storing a logical "1" whenever a slave device connected to Bus S is engaged in a stateful task. In addition to BUSY register block 25, bus-to-bus interface 10 also contains a MASTER ID register block 30. MASTER ID register block 30 contains of a number of MASTER ID registers not shown. Each MASTER ID register stores a master identification tag for every master that has been disconnected pursuant to a Bus S slave issuing a RERUN command. Together, BUSY register block 25 and MASTER ID register block 30 permit bus-to-bus interface 10 to identify which master is attempting an access, and to control when a master may access a slave. The MASTER ID register block 30 shows which master is allowed to reconnect. If the slave is tagged as "Busy", i.e., the slave has issued a RERUN, the corresponding MASTER ID register indicates the master receiving the RERUN. Only a master receiving the RERUN will subsequently be permitted to reconnect to the slave. When a master attempts to access a slave that is marked "Busy", the master identification tag stored in the MASTER ID register is compared to the master identification tag of the accessing master on Bus M. If a match is found, reconnection is allowed. If no match is found, bus-to-interface 10 denies access to the master by issuing a RERUN on bus M. If a slave is not marked "Busy," the bus-to-bus interface 10 always permits a master to connect. Recall from above that masters operating on Bus M have the intrinsic ability to carry out a RERUN command issued by a slave. Recall also that a master is required to carry out a RERUN command if a slave instructs the master to do so, i.e., the master must complete any cycle that it begins.

Figure 3:
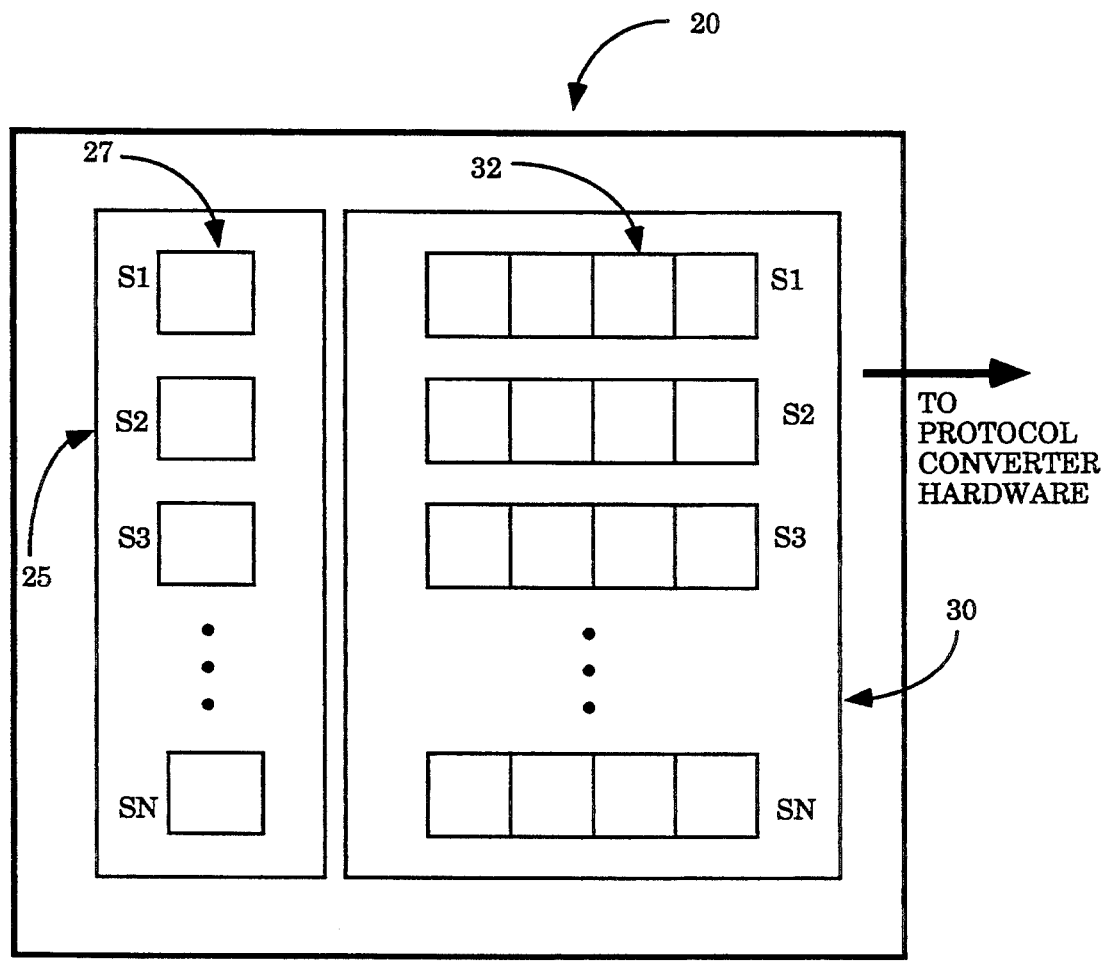
FIG. 3 illustrates the master-slave directory containing slave busy and master identification registers.

Referring briefly to FIG. 3, a block diagram of Master-Slave directory 20 is shown, In FIG. 3, BUSY register block 25 is seen to comprise a multiplicity of individual BUSY registers 27. Specifically, there are sufficient registers so that one BUSY register 27 may be assigned to each slave connected to Bus S. BUSY registers 27 are single bit registers storing a logical "1" whenever the assigned slave is engaged in a task on behalf of a statefully disconnected master, and storing a logical "0" whenever a slave is not engaged on behalf of a statefully disconnected master. Similarly, MASTER ID register block 30 is seen to contain a multiplicity of MASTER ID registers 32. MASTER ID registers 32 are associated one per slave devices, as in the case of BUSY registers 27. MASTER ID registers 32 are multiple bit registers, and may be made in any size and number necessary to store a disconnected master identification code for every slave operating on Bus S. In the preferred embodiment, MASTER ID registers 32 are 4 bit registers. Thus, for every slave interconnected via bus-to-bus interface 10, there is an associated BUSY register 27 and MASTER ID register 32 which provide the master-slave directory function.

For purposes of describing in detail the present invention, the following example will describe the operation of a bus-to-bus transaction, wherein one of the masters operating on Bus M, say Master M1, attempts to access Slave S1 connected to Bus S. Assume that Slave S1 is not engaged in a stateful task on behalf of another master. Master M1 issues a slave-access cycle including the address of the slave to which access is desired. Bus-to-Bus interface 10 recognizes Slave S1 as the desired slave by the address range issued by Master M1. Identification of devices by address space is well known in the art and will not be elaborated upon. Bus-to-bus interface 10 then hands off Master M1 to Slave S1. Slave S1 permits Master M1 to access it, accepts a task, and thereafter issues a RERUN command to Master M1. Bus-to-bus interface 10 will then set the BUSY register 27 for Slave S1 to logic "1", thereby marking Slave S1 as "busy". Bus-to-bus interface 10 will further set MASTER ID register 32 for Slave S1 with an appropriate master identification code identifying the delegating master as Master M1. Slave S1 having issued the RERUN command, Master M1 will disconnect from Bus S through bus-to-bus interface 10, and will attempt to reconnect to Slave S1 at some future time in order to complete the pending transaction.

Assume now that another master, say Master M2, attempts to access Slave S1 subsequent to the disconnection of Master M1. Master M2 also issues an access cycle intended for Slave S1 through bus-to-bus interface 10. Bus-to-bus interface 10 again recognizes Slave S1 as the desired slave by the address range put out by Master M2. Before passing the accessing Master M2 off to Bus S, bus-to-bus interface 10 will first examine BUSY register block 25 for the register corresponding to the slave to which access is desired, in this case, BUSY register 27 corresponding to Slave S1. Bus-to-bus interface 10 will determine that BUSY register 27 is set to logic "1", and therefore that Slave S1 is engaged. Recall that BUSY register 27 for Slave S1 was set when Slave S1 accepted its task from Master M1. Seeing that BUSY register 27 is set, and thus Slave S1 is busy, bus-to-bus 10 interface will further examine MASTER ID register 32 corresponding to Slave S1. Upon such examination, bus-to-bus interface 10 will determine that Master M2 is not the master from which Slave S1 is disconnected. Having determined that Master M2 is not the engaged master, bus-to-bus interface 10 instructs Master M2 to RERUN, after which Master M2 disconnects and releases Bus S. In the case of Master M2, the disconnect is a stateless disconnect, the RERUN being issued by interface 10 because the interface determined that Master M2 could not access Slave S1 at the present time, but that such access may be had sometime later.

Following the disconnection of Master M2, Master M1 may again attempt to access Slave S1, as for example to retrieve data from Slave S1. Master M1 will issue its access instruction together with the address for slave S1. Bus-to-bus interface 10 recognizes the physical address sent by Master M1 and identifying Slave S1 as a valid slave accessible through bus-to-bus interface 10. Bus-to-bus interface 10 again examines BUSY register 27 for Slave S1, which indicates to the bus-to-bus interface 10 that Slave S1 is busy. Next, bus-to-bus interface 10 examines MASTER ID register 32 for Slave S1, at which time bus-to-bus interface 10 identifies Master M1 as the master on whose behalf Slave S1 is busy. Bus-to-bus interface 10 will determine that the master identification code of Master M1 attempting to access Slave S1 matches the master identification code stored in MASTER ID register 32 associated with Master M1. Bus-to-bus interface 10 will then permit Master M1 to connect to Bus S, and access Slave S1. If Slave S1 has finished the task it accepted from Master M1, Slave S1 will signal DONE, at which time Master M1 will retrieve the data stored in Slave S1 and the "busy" status stored in BUSY register 27 of the bus-to-bus interface 10 will be cleared. If Slave S1 is still engaged in the delegated task on behalf of Master M1, Slave S1 will again issue a RERUN command, after which Master M1 will again relinquish control of the bus and disconnect. Thus, it is seen that bus-to-bus interface 10 permits the appropriate master to connect to a Bus S slave statefully occupied on that master's behalf, but prevents another master from accessing such slave while engaged on behalf of the former different master.

Still referring to FIG. 2, if Master 2 wishes to access Slave S3, Master M2 will issue its access instruction together with the address for Slave S3 to bus-to-bus interface 10. Bus-to-Bus interface 10 will recognize that the desired slave, namely Slave S3, is an allowable address for a device connected Bus S. Thereafter, bus-tobus interface 10 will examine BUSY register block 25, and in particular, the BUSY register corresponding to Slave S3. Upon such examination, bus-to-bus interface 10 will determine that Slave S3 is not engaged on behalf of another master, and will permit Master M2 to connect to Bus S and access Slave S3. Accordingly, it is seen that bus-to-bus interface 10 will not block access by a master to another slave if one slave, in this case Slave S1, is statefully occupied.

The principal benefit of the present invention is that bus-to-bus interface 10 permits multiple masters and multiple slaves to optimize use of both Bus M and Bus S, without impeding communications between devices on either bus by a master which remains connected to a bus during a slow slave cycle. Rather, it is desirable and feasible to free the bus during slow slave cycles, so that other masters can use the data path for other purposes, instead of injecting dead cycles into the accessing master's operation until the slave has accomplished its assigned task. The present invention is of particular benefit where the bus which a master desires to access, e.g., Bus S, does not itself contain a master self-identification mechanism. The present invention is also beneficial where the bus cannot make use of address codes issued from bus-to-bus interface 10 operating as a master itself. In such a case, bus-to-bus interface 10 itself must perform the interlock function between masters and slaves on behalf of all the slaves operating on the bus without master identification information. Alternatively, for slaves operating on Bus S on behalf of masters connected to Bus M, there is a master identification code that is associated with each master, so that any slave accessed by a master coupled to Bus M recognizes which master is attempting an access.

It is important to recognize that any time a transaction occurs between a master of Bus M and a slave on Bus S which causes the slave on Bus S to issue a RERUN, such RERUN command will cause the hardware within bus-to-bus interface 10 to set one of the BUSY registers contained within BUSY register block 25, and thereby also capture the master identification code to MASTER ID register block 30 corresponding to the accessing master. Whenever a RERUN occurs, the software operating at a level above the bus protocol level does not recognize that a RERUN command has been issued. Whenever a RERUN occurs, the master device will continue the access attempt, i.e., the attempt to read or write, until such desired access is finally satisfied by a valid acknowledge, e.g., DONE, or ERROR. Note that registers contained in BUSY register block 25 remain set throughout the above discussion, and are the basis for the RERUN command being issued. Registers within BUSY register block 25 bit will be cleared whenever an acknowledge is received from a slave which is not RERUN. DONE and ERROR are the two acknowledge messages which will properly clear the BUSY bit because those messages indicate that the slave no longer is executing a task on behalf of the master. Thus, for example, BUSY register 27 is cleared whenever Slave S1 issues DONE or ERROR acknowledge signals.

Figure 4:
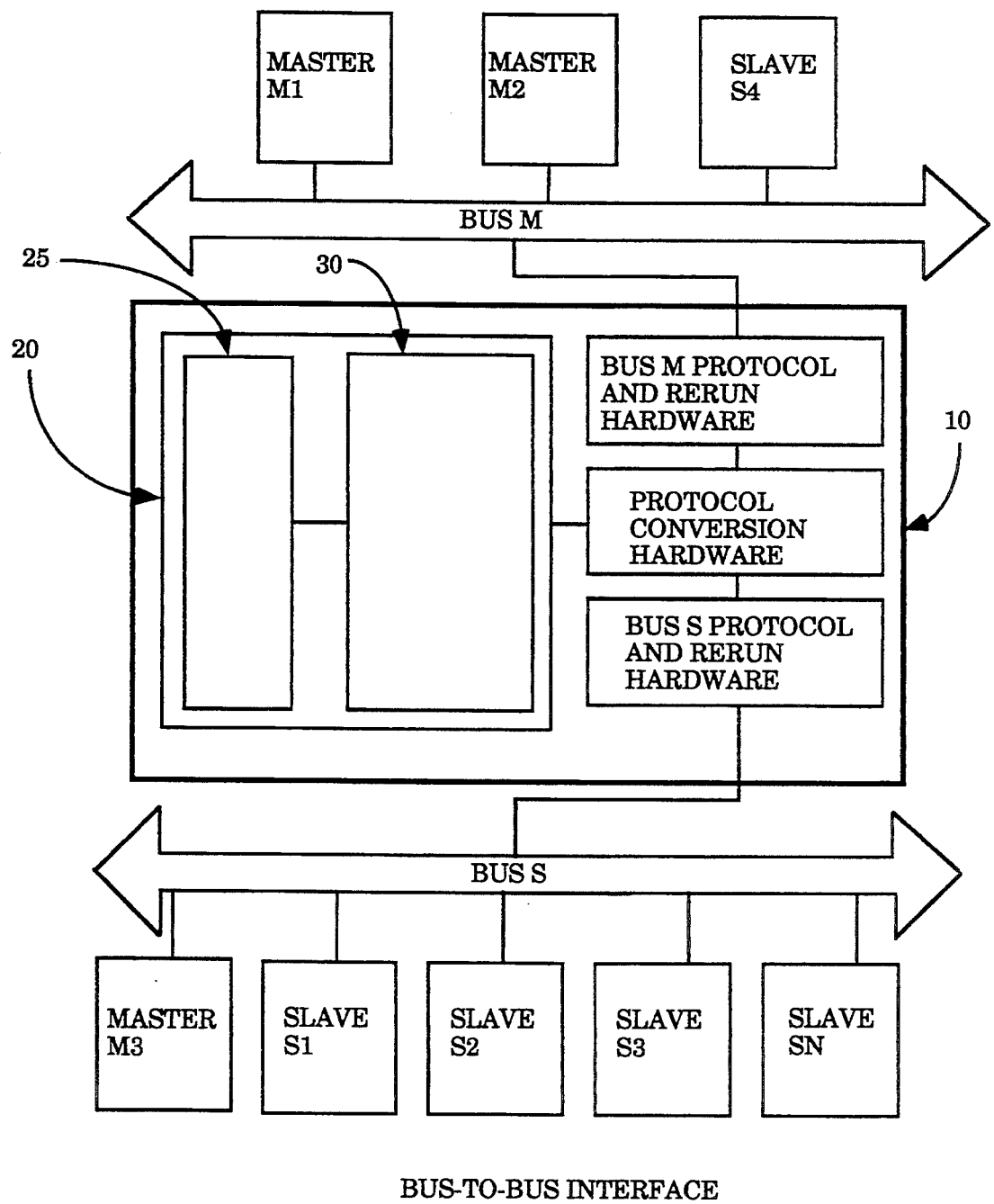
FIG. 4 illustrates the bus-to-bus interface coupling two buses, wherein one bus interconnects both masters and slaves.

Reference is now made to FIG. 4. As illustrated in FIG. 4, bus S is additionally coupled to Master M3, as well as the existing slave devices. The presence of Master M3 on Bus S yields two possible modes of operation. In the first mode, Master M3 on Bus S communicates with slaves on Bus S. In the second mode, Master M3 on Bus S communicates with slaves on Bus M. Note that it is a constraint of the Bus S architecture that no mechanism exists on Bus S to prevent other masters also present on Bus S from communicating with or attempting to access the same slave on Bus M. That is so because no master self-identification mechanism exists on Bus S. With respect to a slave on Bus M, where an access attempt is made from a master connected to Bus S, all that is known is that the access attempt originated from Bus S, even though the access attempt could originate from any one of several masters connected to Bus S. The preferred embodiment of the present invention embraces the Sun Microsystems SBus protocol constraints wherein there is only one slave on Bus M with which a Bus S Master may communicate, and that slave does not issue RERUN commands. Thus, access to a slave by an unintended master is precluded by assigning to a master slaves that do not disconnect statefully. Further, in accordance with SBus protocols, whenever a master on Bus S communicates with a slave on Bus S, the responsibility for preventing unintended access by another master on Bus S to the same slave is placed on higher level operating system software.

Alternatively, masters on Bus M and Master M3 on Bus S may attempt to communicate with a Bus S slave. If either access attempt results in a RERUN command issued by the slave, bus-to-bus interface 10 will monitor all access attempts to that slave to determine if the accessing master is the master that received the original RERUN. For example: if Master M3 attempts to access slave S2, and S2 issues a RERUN, then the BUSY bit corresponding to S2 will be set and the MASTER ID register S2 will indicate Bus S as the master. Subsequently, if Master M1 attempts to access Slave S2, the bus-to-bus interface 10 will detect that Slave S2 is BUSY and that Master M1 is not the master which caused Slave S2 to signal RERUN. Bus-to-bus interface 10 will then issue a RERUN command to Master M1. When Master M3 attempts to access Slave S2, the bus-to-bus interface 10 will determine that Master M3 is a master on Bus S, and is thus allowed to reconnect to Slave S2.

Conversely, if Master M1 accesses Slave S2 and Slave S2 therefore issues a RERUN, the BUSY register for Slave S2 is set and MASTER ID register S2 is coded to indicate Master M1. If Master M3 subsequently attempts to access Slave S2, bus-to-bus interface 10 will detect that Slave S2 is busy and will determine that Master M3 (coded as Bus S) is not the valid reconnect master according to MASTER ID register S2. Thus, bus-to-bus interface 10 will reject the access attempt by Master M3 by issuing a RERUN to Master M3.

Figure 5:
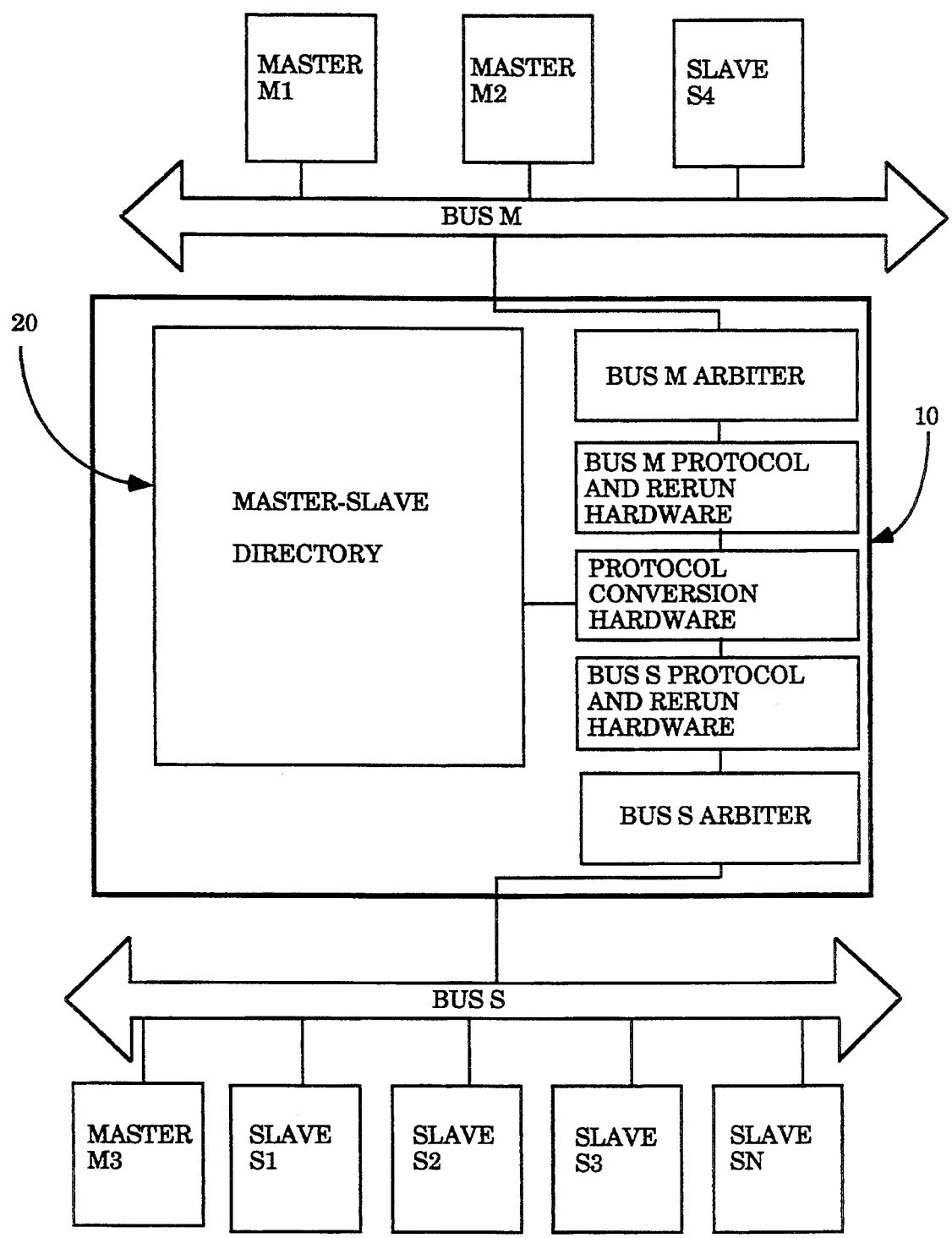
FIG. 5 illustrates a second alternative embodiment of the present invention wherein the bus-to-bus interface incorporates hardware arbitration mechanisms.

Referring now to FIG. 5, a second alternative embodiment of the present invention is shown. In FIG. 5, a bus-to-bus interface 50 may itself contain arbitration hardware for Bus M and Bus S. If bus-to-bus interface 50 is permitted to operate as an arbiter, then even though no master identification exists within Bus S, bus-to-bus interface 50 may still determine which master is issuing an access cycle. In other words, bus-to-bus interface 50 is capable of determining which device is a master, which device is a slave, and can maintain unique tags for each master operating on the respective buses. As an arbiter, bus-to-bus interface 50 may interlock all the masters operating on both buses, thereby controlling access of masters to slaves operating on both buses. It should be noted that implementation of arbitration hardware will require additional hardware gates within bus-to-bus interface 50, in order to implement the master-slave interlock feature on Bus S, compared to the first embodiment discussed in connection with FIGS. 2, 3 and 4 above.

The foregoing has described a bus-to-bus interface preserving data coherence between masters and slaves operating in a multiple processor computer is disclosed. It is contemplated that changes and modifications may be made by one of ordinary skill in the art, to the materials and arrangements of elements of the present invention without departing from the spirit and scope of the invention.

We claim:

1. In a multiple processor computer system having a first bus means and a second bus means, a bus-to-bus interface for coupling said first bus means to said second bus means such that data coherence is preserved, wherein said first bus means is coupled to at least one first bus master and operates according to a first protocol where each first bus master is self-identifying, and wherein said second bus means is coupled to at least one second bus master and a plurality of slaves and operates according to a second protocol where devices coupled to said second bus means are not self-identifying, said bus-to-bus interface comprising:

protocol means including protocol conversion means coupled to said first arid second bus means for permitting transfer of data between said first and second bus masters and said slaves;

directory means, coupled to said protocol means, for maintaining a status for each of said plurality of slaves, for determining that a first slave is performing a task for a disconnected master, said disconnected master being a bus master that is coupled to a one of said first bus means and said second bus means, said disconnected master having commanded the first slave to perform said task and subsequently relinquished said second bus means, the directory means for establishing an identity for said disconnected master and for associating the identity of the disconnected master with the first slave such that only said disconnected master is permitted to access the first slave; and rerun means, coupled to said first and second bus means and to said protocol means, for issuing a rerun command when a one of said at least one first bus master and said at least one second bus master that is not said disconnected master attempts to access said first slave before the disconnected master retrieves data of said task from said first slave, said rerun command instructing said one of said at least one first bus master and said at least one second bus master to relinquish respectively a one of said first and second bus means and to attempt to access said first slave later, whereby transfer of data to an unintended master is prevented.

2. The bus-to-bus interface as set forth in claim 1, wherein said directory means further comprises busy indicator means for setting a busy flag when a particular master engages said first slave and issues an instruction resulting in said first slave issuing a rerun command.

3. The bus-to-bus interface as set forth in claim 2, wherein said directory means further comprises master identification means for identifying said particular master engaging said first slave.

4. The bus-to-bus interface as set forth in claim 3, wherein said busy indicator means further comprises first register means for storing a bit when said busy flag is set.

5. The bus-to-bus interface as set forth in claim 4, wherein said first register means comprises a plurality of first registers.

6. The bus-to-bus interface as set forth in claim 3, wherein said master identification means comprises second register means for storing a master identification tag identifying said particular master engaging said first slave.

7. The bus-to-bus interface as set forth in claim 6, wherein said second register means comprises a plurality of second registers.

8. The bus-to-bus interface as set forth in claim 7, wherein each of said second registers is associated with one of said first registers.

9. The bus-to-bus interface as set forth in claim 1, wherein said first bus means further comprises first bus master identification means.

10. The bus-to-bus interface set forth in claim 9, wherein said first bus masters are self-identifying.

11. The bus-to-bus interface as set forth in claim 1 further comprising means for second bus master identification.

12. The bus-to-bus interface as set forth in claim 1, wherein said rerun means issues only one rerun command.

13. The bus-to-bus interface as set forth in claim 1, wherein each of said slaves is identified by a block of address space.

14. The bus-to-bus interface as set forth in claim 1, wherein said slaves issue said rerun command.

15. In a multiple processor computer system having a first bus means and a second bus means, a bus-to-bus interface for coupling said first bus means to said second bus means such that data coherence is preserved, wherein said first bus means is coupled to at least one first bus master and operates according to a first protocol where each first bus master is self-identifying, and wherein said second bus means is coupled to at least one second bus master and a plurality of slaves and operates according to a second protocol where devices coupled to said second bus means are not self-identifying, said bus-to-bus interface comprising:

protocol means including protocol conversion means coupled to said first and second bus means for permitting transfer of data between said first and second bus means and said slaves;

busy indicator means, coupled to said first and second bus means, for maintaining a status for each of said plurality of slaves, for setting a busy flag when a first slave issues a first rerun command in response to said first slave accepting a command to perform a task from a first master, said first master being coupled to a one of said first bus means and said second bus means, said first rerun command causing said first master to relinquish said first and second bus means and to attempt to access said first slave later, said busy indicator means permitting only said first master to access said first master while said busy flag is set;

master identification means coupled to said first and second bus means for identifying each of said first and second bus masters that engages one of said plurality of slaves, for generating a master identification tag identifying each of said first and second bus masters that engages a one of said plurality of slaves, and for storing each master identification tag; and rerun means coupled to said first and second bus means for issuing a second rerun command when a one of said first and second bus masters other than said first master attempts to access said first slave, said second rerun command causing said one of said first and second bus masters to relinquish said first and second bus means and to attempt to access said first slave later;

said first master continuing to attempt to access said first slave and relinquishing said first and second bus means after receiving said first rerun command issued by said first slave until said first slave is no longer performing said task, said bus-to-bus interface permitting said first master to access said first slave and retrieve data after said first slave is no longer performing said task, whereby to prevent transfer of data to an unintended master.

16. The bus-to-bus interface as set forth in claim 15, wherein said busy indicator means comprises first register means including a plurality of first registers for storing, when said busy flag is set, a bit when said first slave is engaged.

17. The bus-to-bus interface as set forth in claim 16, wherein said master identification means comprises second register means including a plurality of second registers for storing said master identification tag corresponding to said first master engaging said first slave.

18. The bus-to-bus interface as set forth in claim 17, wherein said each of said second registers is associated with one of said first registers.

19. The bus-to-bus interface as set forth in claim 18, wherein said second register means stores said master identification tag in a particular second register when said busy flag is set.

20. The bus-to-bus interface as set forth in claim 15, wherein said first bus means further comprises first bus master identification means.

21. The bus-to-bus interface as set forth in claim 20, where said first bus masters are self-identifying.

22. The bus-to-bus interface as set forth in claim 15, wherein said bus-to-bus coupler further comprises second bus master identification means.

23. The bus-to-bus interface as set forth in claim 15, wherein said rerun means issues only one rerun command.

24. The bus-to-bus interface as set forth in claim 15, wherein said each of said first and second bus slaves is identified by a block of address space.

25. In a multiple processor computer system having a first bus means and a second bus means, a method for coupling said first bus means to said second bus means such that data coherence is preserved, wherein said first bus means is coupled to at least one first bus master and operates according to a first protocol where each first bus master is self-identifying, and wherein said second bus means is coupled to at least one second bus master and a plurality of slaves and operates according to a second protocol where devices coupled to said second bus means are not self-identifying, said method comprising the steps of:

providing protocol means including protocol conversion means for permitting transfer of data between said first and second bus masters and said slaves;

providing directory means for maintaining a status for each of said plurality of slaves, for determining that a first slave is performing a task for a disconnected master, said disconnected master being a bus master that is coupled to a one of said first bus means and said second bus means, said disconnected master having commanded the first slave to perform said task and subsequently relinquished said second bus means, the directory means for establishing an identity for said disconnected master and associating the identity of the disconnected master with the first slave such that only said disconnected master is permitted to access the first slave; and providing rerun means for issuing a rerun command when a one of said at least one first bus master and said at least one second bus master that is not said disconnected master attempts to access said first slave before the disconnected master retrieves data of said task from said first slave, said rerun command instructing said one of said at least one first bus master and said at least one second bus master to relinquish respectively a one of said first and second bus means and to attempt to access said first slave later, whereby transfer of data to an unintended master is prevented.

26. The method as set forth in claim 25, wherein providing said directory means further comprises providing busy indicator means for setting a busy flag when a particular master engages said first slave.

27. The method as set forth in claim 26, wherein providing said directory means further comprises providing master identification means for identifying said particular master engaging said first slave.

28. The method as set forth in claim 27 wherein providing said directory means further comprises providing first register means for storing a bit when said busy flag is set.

29. The method as set forth in claim 28, wherein said first register means comprises a plurality of first registers.

30. The method as set forth in claim 29, wherein providing said master identification means further comprises providing second register means for storing a master identification tag corresponding to said particular master engaging said first slave.

31. The method as set forth in claim 30, wherein second register means comprises a plurality of second registers.

32. The method as set forth in claim 31, wherein each of said second registers is associated with one of said first registers.

33. The method as set forth in claim 25, wherein said first bus means further comprises first bus master identification means.

34. The method as set forth in claim 25 wherein said rerun means issues only one rerun command.

35. The method as set forth in claim 25, wherein said each of said slaves is identified by a block of address space.

* * * * *